(12) United States Patent
Eilemann et al.

(10) Patent No.: US 9,175,596 B2
(45) Date of Patent: Nov. 3, 2015

(54) INTAKE PIPE HAVING AN INTEGRATED INTERCOOLER

(75) Inventors: Andreas Eilemann, Erdmannhausen (DE); Hubert Pomin, Sindelfingen (DE); Christian Saumweber, Stuttgart (DE); Veit Bruggesser, Hildrizhausen (DE); Jürgen Stehlig, Neckartenzlingen (DE)

(73) Assignee: MAHLE INTERNATIONAL GMBH, Stuttgart (DE)

(*) Notice: Subject to any disclaimer, the term of this patent is extended or adjusted under 35 U.S.C. 154(b) by 121 days.

(21) Appl. No.: 13/995,225

(22) PCT Filed: Dec. 20, 2011

(86) PCT No.: PCT/EP2011/073488
§ 371 (c)(1),
(2), (4) Date: Sep. 18, 2013

(87) PCT Pub. No.: WO2012/085008
PCT Pub. Date: Jun. 28, 2012

(65) Prior Publication Data
US 2014/0000569 A1    Jan. 2, 2014

(30) Foreign Application Priority Data
Dec. 20, 2010 (DE) .......................... 10 2010 063 602

(51) Int. Cl.
*F02B 33/00* (2006.01)
*F02B 29/04* (2006.01)
(Continued)

(52) U.S. Cl.
CPC ......... *F02B 29/0456* (2013.01); *F02B 29/0462* (2013.01); *F28D 7/1692* (2013.01);
(Continued)

(58) Field of Classification Search
CPC .... F02B 29/04; F02B 29/045; F02B 29/0456; F02B 29/0462; F28D 7/1692; F28D 21/0003; F28F 9/0075; F28F 9/0138; Y02T 10/146

USPC .................................. 123/563, 542; 165/148
See application file for complete search history.

(56) References Cited

U.S. PATENT DOCUMENTS

| 4,434,845 A | 3/1984 | Steeb |
| 8,016,025 B2 | 9/2011 | Brost et al. |

(Continued)

FOREIGN PATENT DOCUMENTS

| CN | 1882818 A | 12/2006 |
| CN | 101432589 A | 5/2009 |

(Continued)

OTHER PUBLICATIONS

International Search Report, PCT/EP2011/073488, Mar. 14, 2012, 2 pgs.

(Continued)

*Primary Examiner* — Marguerite McMahon
(74) *Attorney, Agent, or Firm* — Paul D. Strain, Esq.; Strain & Strain PLLC

(57) ABSTRACT

The invention relates to an intake pipe for an internal combustion engine of a motor vehicle, comprising a housing that defines a charge-air channel and an intercooler having a cooler block, which is arranged in the housing in such a way that the charge air can flow through the cooler block. The cooler block of the intercooler terminates on a side facing the housing with an outer component, preferably a cooling fin, and at least one recess is formed in said outer component of the cooler block, the at least one recess extending at least across part of the length of the cooler block substantially perpendicularly to the charge-air flow direction. Furthermore, at least one projection is provided on an inside face of the housing facing the cooler block of the intercooler, said projection extending at least across part of the inner face of the housing substantially perpendicularly to the charge-air flow direction and engaging at least partially in the at least one recess of the cooler block in a sealing manner.

18 Claims, 8 Drawing Sheets

Figure 1:
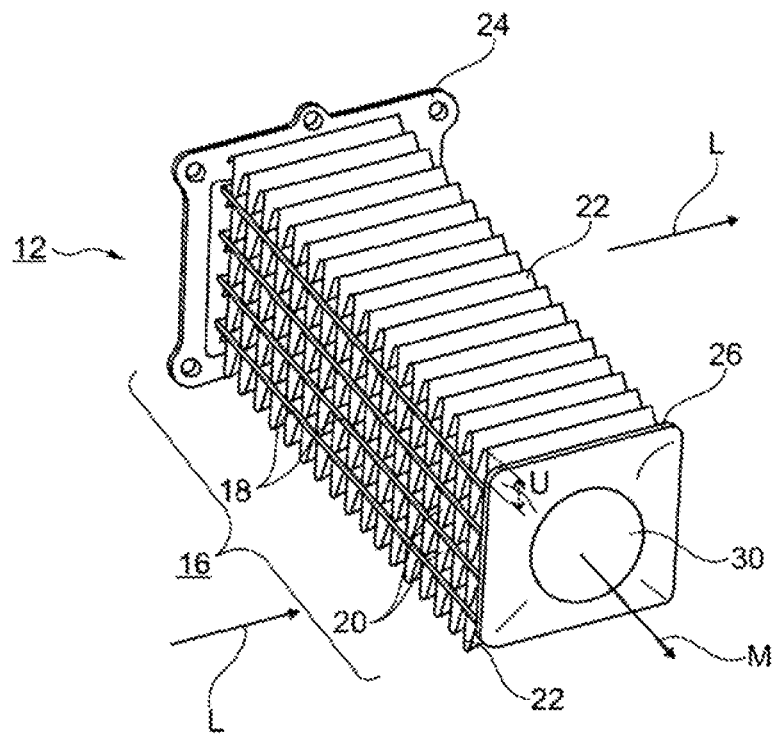

(51) Int. Cl.
*F28D 7/16* (2006.01)
*F28F 9/007* (2006.01)
*F28F 9/013* (2006.01)
*F28D 21/00* (2006.01)

(52) U.S. Cl.
CPC .............. *F28F9/0075* (2013.01); *F28F 9/0138* (2013.01); *F28D 21/0003* (2013.01); *Y02T 10/146* (2013.01)

(56) References Cited

U.S. PATENT DOCUMENTS

| | | |
|---|---|---|
| 8,286,615 B2 | 10/2012 | Dehnen et al. |
| 8,651,092 B2 * | 2/2014 | Ghiani .......................... 123/542 |
| 2003/0196785 A1 * | 10/2003 | Knecht et al. ................ 165/148 |
| 2007/0175617 A1 | 8/2007 | Brost et al. |
| 2007/0181105 A1 * | 8/2007 | Bazika ......................... 123/563 |
| 2009/0272515 A1 | 11/2009 | Wu et al. |
| 2012/0210986 A1 * | 8/2012 | Ghiani ......................... 123/542 |

FOREIGN PATENT DOCUMENTS

| | | |
|---|---|---|
| DE | 43 07 504 C1 | 9/1994 |
| DE | 10 2005 049 310 A1 | 4/2007 |
| DE | 10 2006 040 851 A1 | 3/2008 |
| DE | 10 2007 030 464 A1 | 1/2009 |
| DE | 10 2009 012 024 A1 | 9/2010 |
| DE | 10 2009 050 258 B3 | 11/2010 |
| DE | 10 2009 025 282 A1 | 12/2010 |
| EP | 1 785 609 A1 | 5/2007 |
| EP | 2 014 892 A1 | 1/2009 |
| WO | WO 2009/132418 A1 | 11/2009 |

OTHER PUBLICATIONS

German Search Report, DE 10 2010 063 602.9, Sep. 26, 2011, 8 pgs.
Chinese Office Action and English translation thereof, Appl. No. 201180061395.0, Dec. 31, 2014, 18 pgs.

* cited by examiner

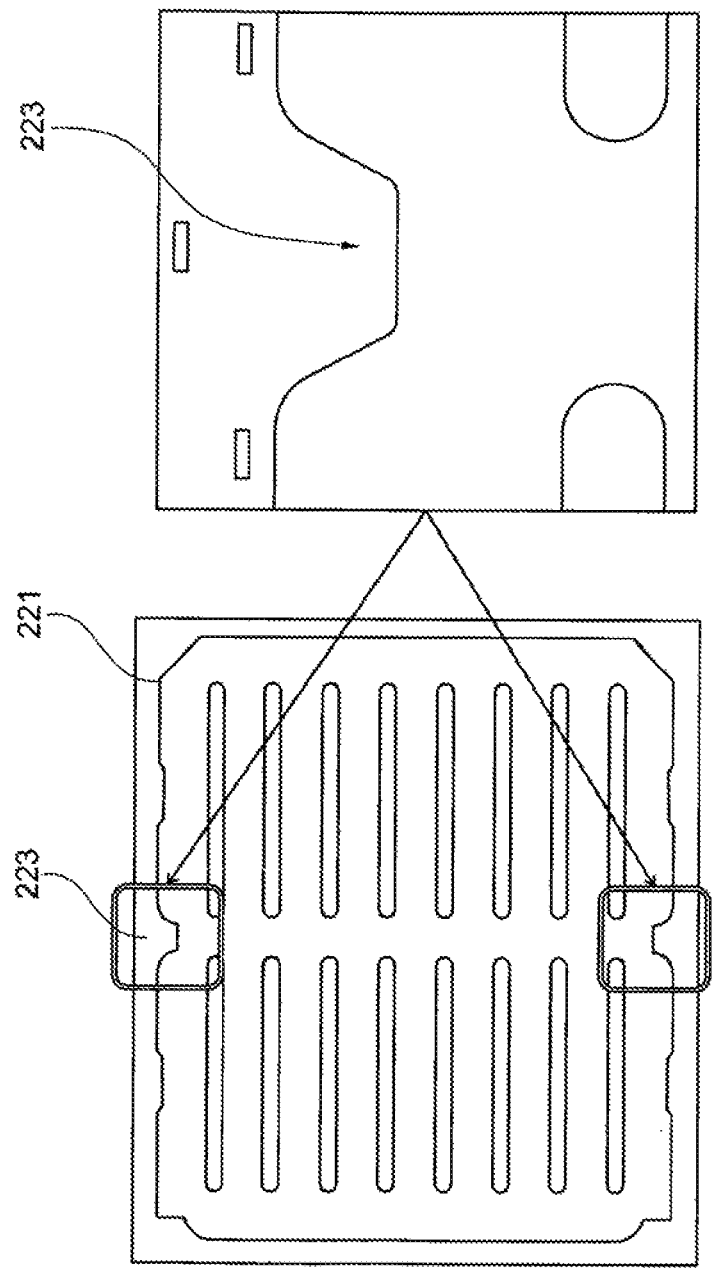

INTAKE PIPE HAVING AN INTEGRATED INTERCOOLER

CROSS-REFERENCE TO RELATED PATENT APPLICATIONS

This application is a National Stage of International Application No. PCT/EP2011/073488, filed Dec. 20, 2011, which is based upon and claims the benefit of priority from prior German Patent Application No. 10 2010 063 602.9, filed Dec. 20, 2010, the entire contents of all of which are incorporated herein by reference in their entirety.

The present invention relates to an intake pipe for an internal combustion engine, in particular of a motor vehicle, in accordance with the preamble of claim 1.

It is known to configure intercoolers for internal combustion engines as indirect radiators, in which the warmth of the charge air flow is dissipated by means of a cooling fluid which flows through the radiator. It is known, furthermore, that intercoolers of this type can be integrated into an intake pipe of the internal combustion engine. It is customary here to provide the intercooler with a flange plate, with the result that it can be pushed into an opening of an intake pipe housing transversely with respect to the charge air flow direction and can be screwed or welded to the housing by way of an edge of the flange plate.

Intake pipes of this type with an integrated intercooler are disclosed, for example, in DE 10 2007 030 464 A1, DE 10 2009 012 024 A1, DE 10 2009 025 282 A1 and DE 10 2009 050 258 B3.

In DE 10 2009 012 024 A1, the flange element and the plate element are configured separately from the radiator block of the intercooler and are sealed with respect to the radiator block and the intake pipe housing. In DE 10 2009 025 282 A1, the entire intercooler is surrounded by the intake pipe housing and the intercooler has side parts which have a structuring in order to form a labyrinth seal with respect to an inner wall of the intake pipe housing, in order to reduce a leakage flow of the charge air between the intercooler and the intake pipe housing. In addition or as an alternative, the use of elastomer seals between the side parts of the intercooler and the inner side of the intake pipe housing is also known.

The intercooler of DE 10 2009 050 258 B3 has at least one cooling fluid box as integral constituent part which at the same time forms part of the intake pipe housing. In contrast to this, in the intake pipe of DE 10 2007 030 464 A1, at least one of the cooling fluid boxes of the intercooler is configured as an integral constituent part of the intake pipe housing.

It is the object of the invention to provide an intake pipe with an integrated intercooler with improved cooling performance.

According to the invention, this is achieved by an intake pipe having the features of claim 1 or 2. Developments and refinements of the invention which are to be preferred are the subject matter of the subclaims.

The intake pipe, in particular for an internal combustion engine, in particular of a motor vehicle, has a housing which defines a charge air channel, and an intercooler with a radiator block which is arranged in the housing in such a way that the charge air can flow through it. According to the invention, on a side which faces the housing, the radiator block of the intercooler terminates with an outer structural element, preferably a cooling element, and at least one recess is formed in said outer structural element of the radiator block, which recess extends at least over part of the length of the radiator block substantially transversely with respect to a charge air flow direction. In addition, at least one projection is provided on an inner side of the housing, which inner side faces the radiator block of the intercooler, which projection extends at least over part of the inner side of the housing substantially transversely with respect to the charge air flow direction and engages sealingly at least partially into the at least one recess of the radiator block.

As an alternative, the object is achieved by an intake pipe for an internal combustion engine, in particular of a motor vehicle, having a housing (10) which defines a charge air channel, and having an intercooler with a radiator block which is arranged in the housing in such a way that the charge air can flow through it, the radiator block of the intercooler terminating with an outer structural element on a side which faces the housing; at least one projection is formed on said outer structural element of the radiator block, which projection extends at least over part of the length of the radiator block substantially transversely with respect to a charge air flow direction (L); and at least one recess is provided on an inner side of the housing, which inner side faces the radiator block of the intercooler, which recess extends at least over part of the inner side of the housing substantially transversely with respect to the charge air flow direction (L), and the projection engaging sealingly at least partially into the at least one recess.

An effective sealing action between the radiator block and the intake pipe housing is provided by the mutual sealing engagement between the recess in the outer structural element of the radiator block and the projection on the inner side of the intake pipe housing, which sealing action reduces leakage flow of the charge air between the radiator block and the intake pipe housing, which leakage flow flows past the intercooler in a virtually uncooled manner, and increases the cooling performance in this way.

Since the radiator block of the intercooler terminates with an outer structural element and the at least one recess is formed in said outer structural element, a side part of the intercooler with sealing elements attached thereto can be omitted in contrast to conventional intake pipes with an integrated intercooler. In this way, the weight, the outlay on material and the production costs of the intercooler and therefore of the intake module which is formed from the intake pipe and the intercooler can be reduced. Moreover, the cross section of the intercooler, through which cross section the charge air flows, can be widened in this way.

Since the radiator block of the intercooler terminates with an outer structural element, preferably in the form of a cooling element, the remaining leakage flow of the charge air which possibly flows past the radiator block despite the sealing construction according to the invention between the radiator block and the inner side of the intake pipe housing is cooled at least somewhat by the outer cooling element of the radiator block. The leakage flow therefore experiences a considerably higher cooling action in comparison with conventional constructions of the intake pipe with an integrated intercooler. This results in the further advantage that, in comparison with conventional constructions, greater leakage flows of the charge air between the radiator block and the intake pipe housing may be permitted before a discernible increase in the temperature of the charge air flow at the inlet of the internal combustion engine occurs.

In the context of the invention, "charge air" is understood to mean the gas which is fed to an internal combustion engine. In this context, the "charge air" also comprises any desired mixtures of air and exhaust gas if the internal combustion engine is equipped with an exhaust gas recirculation system. The intake pipe according to the invention can be combined both with gasoline engines and with diesel engines. Moreover, the intake pipe according to the invention can be used in internal combustion engines with and without a turbocharger.

The "charge air flow direction" denotes the main flow direction of the charge air through that section of the intake pipe housing, in which the intercooler is arranged.

In this context, the term "radiator block" denotes that part of the intercooler, in which the heat exchange between the charge air and the cooling fluid (for example, water, refrigerant, etc.) takes place. The essential constituent parts of the radiator block are a plurality of cooling fluid channels and, preferably in addition, a plurality of cooling elements which are arranged between the cooling fluid channels, preferably in the form of cooling fins. The cooling fluid channels are preferably configured and arranged in the manner of a tube cooler or tubular cooler or a stacked plate cooler. The cooling elements between the tubes are in a thermally conducting connection with said tubes and increase the effective heat exchanging area of the radiator block. The radiator block is preferably of substantially rectangular configuration, the main sides lying substantially transversely with respect to the charge air flow direction and being flowed through by the charge air, without it being intended that the invention is restricted to said geometry. The radiator block is delimited at its two ends in each case by a collecting plate which has openings for receiving the cooling fluid channels. The cooling fluid channels then open through said collecting plates in each case into a header (frequently also called cooling fluid box or water box). The headers are provided with an inflow connector stub and an outflow connector stub for feeding in and discharging the cooling fluid to and from the intercooler. Here, the inflow and outflow can either both be provided on the same header or on different headers. Accordingly, in the context of the invention, intercoolers with a single flow direction (I-shaped flow path), double flow direction (U-shaped flow path) or multiple flow direction are possible. Furthermore, in the context of the invention, one or both headers can be configured integrally with the radiator block, can be configured as separate components and can be connected to the radiator block (for example, welded, brazed or adhesively bonded), or can be configured integrally with the intake pipe housing and can be sealed with respect to the radiator block.

The "outer structural element" of the radiator block denotes a constituent part of the radiator block itself, for example in contrast to a side part or housing part around the radiator block. Said outer structural element is preferably configured as a cooling element of the radiator block. Said cooling element is preferably a cooling fin or another element with a large heat exchanging area.

The term "substantially transversely with respect to the charge air flow direction" includes, in particular, a direction perpendicularly with respect to the charge air flow direction, but also directions with a main component perpendicularly with respect to the charge air flow direction, that is to say directions in an angular region of, for example, approximately ±30 degrees with respect to the perpendicular to the main flow direction.

In the context of the invention, the "recess" and "projection" which engage into one another are in principle shaped in any desired manner as long as they are of substantially complementary configuration with respect to one another, with the result that they achieve a sufficient sealing action by the formation of a labyrinth. The recess is preferably of groove-like configuration. The recess and projection are preferably configured with at least partially round or rounded cross-sectional shapes.

The recess and projection are to extend in each case at least over part of the radiator block or the inner side of the housing transversely with respect to the charge air flow direction. In this context, this means that the recess and the projection extend in each case over the entire width of the charge air channel transversely with respect to the charge air flow direction or only over part of said width. The recess and projection preferably run substantially parallel to the longitudinal direction of the radiator block, but can also run at a predefined angle with respect to said longitudinal direction of the radiator block within the context of the invention.

The recess and projection are preferably arranged in the charge air flow direction centrally with respect to the radiator block or symmetrically with respect to the center of the radiator block, without it being intended that the invention is restricted to said embodiments.

The "projection" on the inner side of the housing is preferably configured in one piece with the housing. In another preferred embodiment, the at least one projection is configured as a separate component and is connected fixedly to the housing (for example, welded, adhesively bonded and/or clamped). Here, the housing has, for example, a recess or cutout, into which the projection can be inserted. In the last-mentioned embodiment, the projection can be formed, independently of the material of the intake pipe housing, from a material which is sufficiently dimensionally stable for the seal construction.

In this context, the terminology that the projection engages "at least partially" into the recess is intended to mean that the projection engages into the recess over at least part of the length of the projection or the recess in the width direction of the charge air channel and/or at least into part of the depth of the recess.

The engagement of the projection is configured in such a way that the overlap between the projection and the recess exists to a sufficient extent even when the housing inflates as a result of the pressure and bulges outward. This inflation can reduce the engagement by several millimeters. It is preferred if there were still at least an overlap of from 2 to 5 mm even in the inflated state.

According to the invention, "at least one recess" and "at least one projection" are provided. This comprises numbers of precisely one, two, three or more recesses and/or projections. The numbers of recesses and projections preferably coincide with one another. If a plurality of recesses and projections are provided, that is to say at least two, they preferably but not necessarily run substantially parallel to one another. If a plurality of recesses and projections are provided, these can all extend over the entire width of the charge air channel or can take up only part of said width. In the last-mentioned case, the recesses and projections are preferably arranged offset with respect to one another in each case in the longitudinal direction of the radiator block of the intercooler, with the result that overall the entire width of the charge air channel is preferably provided with the sealing measure according to the invention. In the case of a plurality of recesses and projections, they are preferably dimensioned to be substantially identical to one another, but they can also have different depths and/or thicknesses in the context of this invention.

According to the invention, a sealing construction comprising at least one recess in the outer structural element of the radiator block and at least one projection on the inner side of the intake pipe housing is provided on a side of the radiator block, which side faces the housing. A sealing construction of this type is preferably provided on both sides of the radiator block which face an inner side of the housing. In the context of the invention, however, it is also possible that the sealing construction according to the invention is provided only on one side of the radiator block and the other side of the radiator block is sealed in another way with respect to the inner side of the intake pipe housing.

The sealing construction according to the invention between the intake pipe housing and the radiator block does not rule out that further sealing measures are provided. For example, sealing elements such as an elastomer seal and the like can additionally be arranged between the radiator block and the intake pipe housing.

The present invention can preferably be used for intake pipes, in which the intercooler is flowed through at all times by the entire charge air flow. However, the construction according to the invention can also preferably be used in intake pipes, in which a bypass channel is provided which is guided past the intercooler. In this case, the actuating elements for setting a mass flow ratio between the intercooler and the bypass channel can optionally be arranged upstream and/or downstream of the intercooler in the intake pipe housing. Moreover, the bypass channel can optionally be divided by means of a dividing wall which is arranged in the intake pipe housing or can be configured at least in sections as a pipe guide which is separate from the main channel.

In the following text, developments and refinements of the invention to be preferred will be described.

In one advantageous refinement of the invention, the housing has an opening for pushing the intercooler into the housing in the direction transversely with respect to the charge air flow direction. The (lateral) pushing of the intercooler into the intake pipe housing preferably takes place transversely with respect to the charge air flow direction and therefore substantially in the longitudinal direction of the intercooler or of its radiator block.

The opening of the intake pipe housing is of closable configuration, in order to seal the charge air channel. For this purpose, a flange or the like is preferably provided on the rear collecting plate in the push-in direction of the intercooler or on the rear header in the push-in direction of the intercooler, which flange is, for example, screwed or welded to the intake pipe housing. The flange is preferably configured in one piece with the collecting plate or the header.

In one exemplary embodiment, the housing of the intake pipe can also be configured with two openings on housing sides which face away from one another, through which openings the intercooler can be pushed. In this case, both openings can be closed as described above. This embodiment is advantageous, in particular, when one header of the intercooler is provided with the inflow connector stub and the other header of the intercooler is provided with the outflow connector stub.

Instead of pushing the intercooler into the intake pipe housing in the longitudinal direction of said intercooler, it is in principle also conceivable to divide the intake pipe housing in the charge air flow direction and to place the intercooler between the two housing parts.

In one advantageous refinement of the invention, the at least one recess in the outer structural element of the radiator block is formed by the at least one projection on the inner side of the housing during a mounting operation of the intercooler into the housing of the intake pipe. The projection on the inner side of the housing preferably presses the outer structural element inward (plastic deformation) and thus forms the recess. In this way, a sealing construction with at most very small gaps between the radiator block and the intake pipe housing is achieved. Since the recess is formed automatically during the mounting operation, a corresponding production step before the mounting is omitted, as a result of which the production costs of the intercooler can be reduced. This embodiment can be used both in the case of an intercooler which can be pushed in laterally and also in the case of an intercooler which can be inserted.

In one advantageous refinement of the invention, the at least one recess is preformed in the outer structural element of the radiator block and, during a mounting operation of the intercooler into the housing of the intake pipe, is brought into engagement with the at least one projection on the inner side of the housing. On account of the preformed recess in the outer structural element, the mounting operation of the intercooler can be carried out in a more simple manner, in particular with less application of force. This embodiment can also be used both in the case of an intercooler which can be pushed in and in the case of an intercooler which can be inserted.

In one particular refinement, the corrugated fins are of weakened configuration, in particular are pre-perforated, in the region of the peak of the corrugated fin. Furthermore, the corrugated fins can be interrupted in the region of the recess by way of a cut, for examples using a knife.

In one advantageous refinement of the invention, the intercooler has a collecting plate on its front side in the installation direction, the outer structural element of the radiator block projecting beyond said collecting plate by a projecting length. This embodiment is advantageous, in particular, in the case of an intercooler which can be pushed laterally into the intake pipe housing. It can be prevented in this way that the front collecting plate interferes with the projection on the inner side of the housing during the mounting operation, which projection is intended to engage into the recess in the outer structural element or is intended to form said recess when the intercooler is pushed into the intake pipe housing.

In this embodiment of the intake pipe according to the invention, the projecting length of the outer structural element of the radiator block is preferably at least approximately 20%, more preferably at least approximately 30%, even more preferably at least approximately 40% of a height of the outer structural element in the direction transversely with respect to the charge air flow direction. Moreover, the projecting length of the outer structural element of the radiator block is preferably at most approximately 80%, at most approximately 70%, more preferably at most approximately 60% of the height of the other structural element in the direction transversely with respect to the charge air flow direction.

In one advantageous refinement of the invention, the intercooler has a collecting plate on its front side in the installation direction and said front collecting plate of the intercooler is provided with at least one guide element, into which the at least one projection on the inner side of the housing can engage during the mounting operation of the intercooler into the housing. The guide element is preferably configured to be substantially complementary with respect to the projection on the inner side of the intake pipe housing and is dimensioned to be somewhat greater than the latter. This embodiment is advantageous, in particular, in the case of an intercooler which can be pushed laterally into the housing. The guide element assists the correct push-in direction of the intercooler into the intake pipe housing and the correct positioning of the preformed formation or formation which is still to be formed relative to the projection on the inner side of the housing. The number of guide elements preferably corresponds to the number of projections, but can also be selected to be smaller or greater.

In one advantageous refinement of the invention, the projection on the inner side of the housing has an increasing depth perpendicularly with respect to the charge air flow direction in the installation direction of the intercooler. This embodiment is advantageous, in particular, in the case of an intercooler which can be pushed laterally into the housing, since it facilitates the forming of the recess in the outer structural element. The term "increasing depth" is intended to include all refinements, in which the depth of the projection on the side of the push-in opening is smaller than at the other end. The depth of the projection preferably increases continuously, that is to say without sections with a decreasing depth. This can preferably take place constantly or in a stepped manner.

In this embodiment of the invention, a mean gradient of the depth of the projection is preferably at least approximately 0.1°, more preferably at least approximately 0.25°, even more preferably at least approximately 0.35°. In addition, the mean gradient of the depth of the projection is preferably at most approximately 5°, more preferably at most approximately 2°, even more preferably at most approximately 1°.

In one advantageous refinement of the invention, a ratio of a height of the outer structural element of the radiator block transversely with respect to the charge air flow direction to a depth of the projection on the inner side of the housing is at least approximately 0.3, more preferably at least approximately 0.5. In addition, the ratio of the height of the outer structural element of the radiator block to the depth of the projection on the inner side of the housing is preferably at most approximately 3:1, more preferably at most approximately 2:1. In the case of a depth of the projections which increases in the installation direction of the intercooler, the ratios which are specified here relate to the mean depth of said projections.

Figure 2:
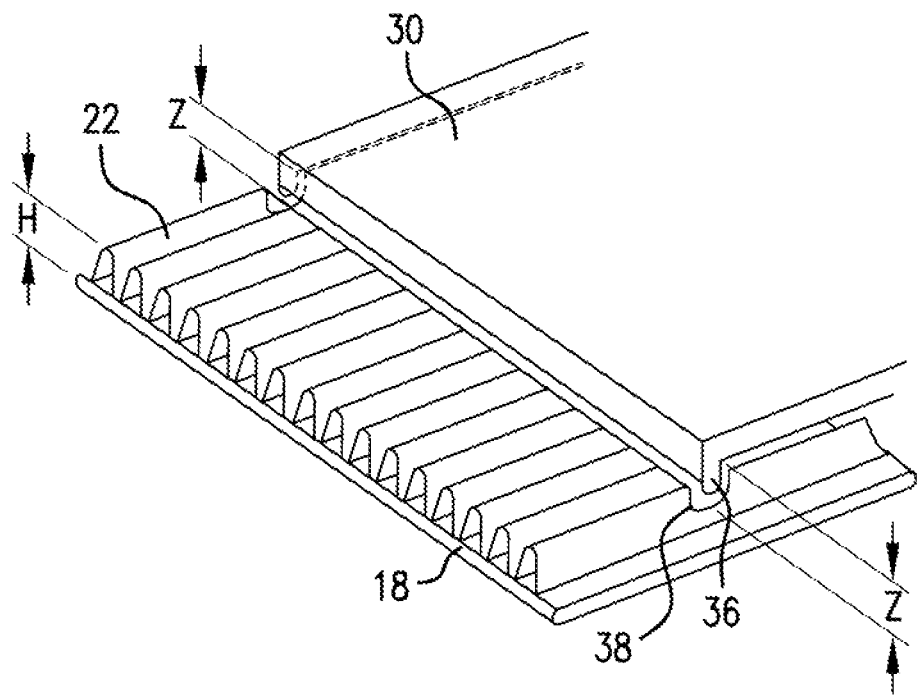
Figure 3:
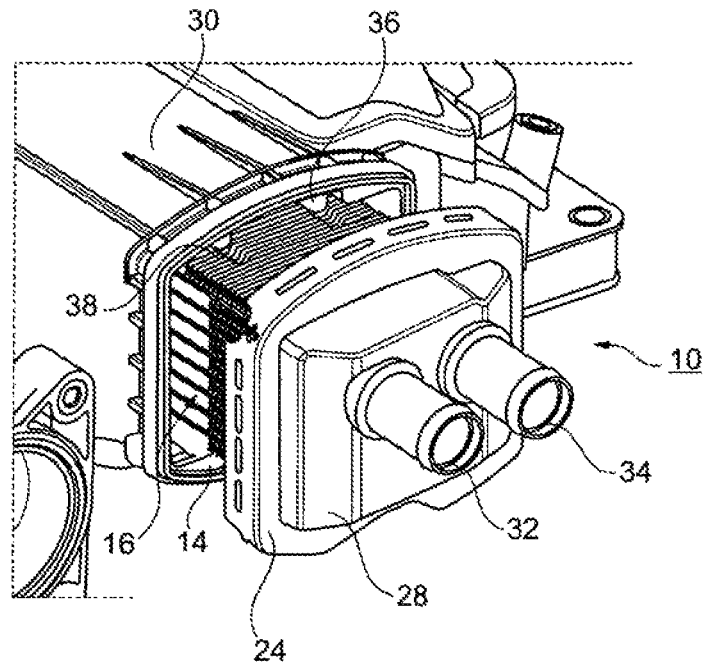
Figure 4:
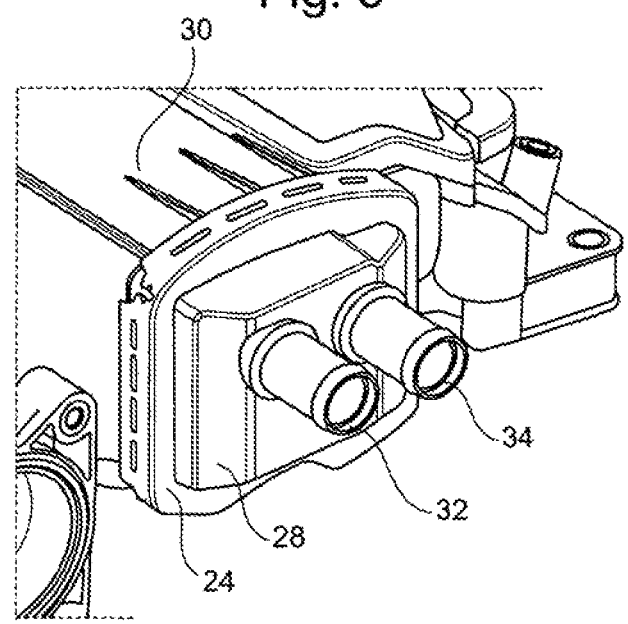
Figure 5:
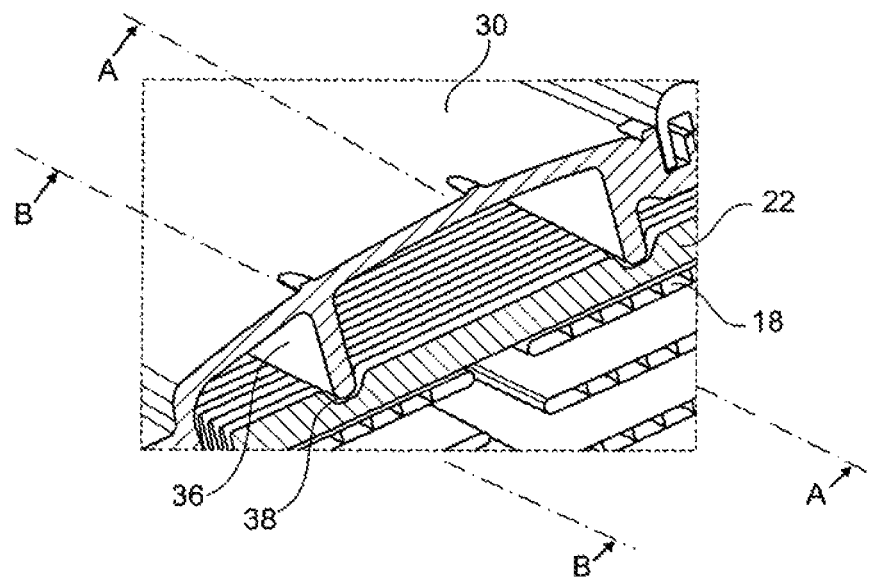
Figure 6:
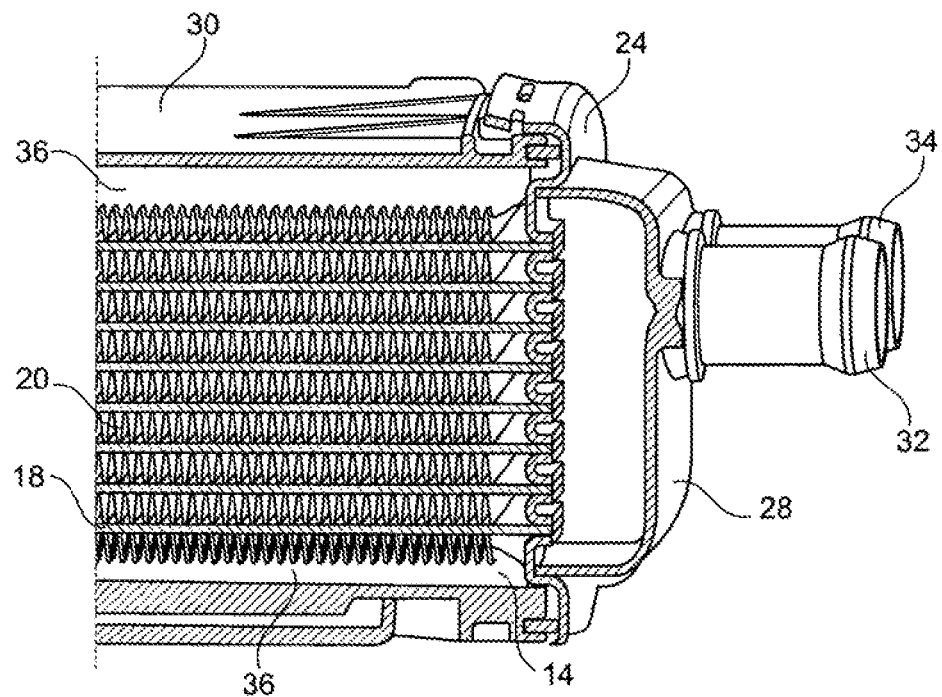
Figure 7:
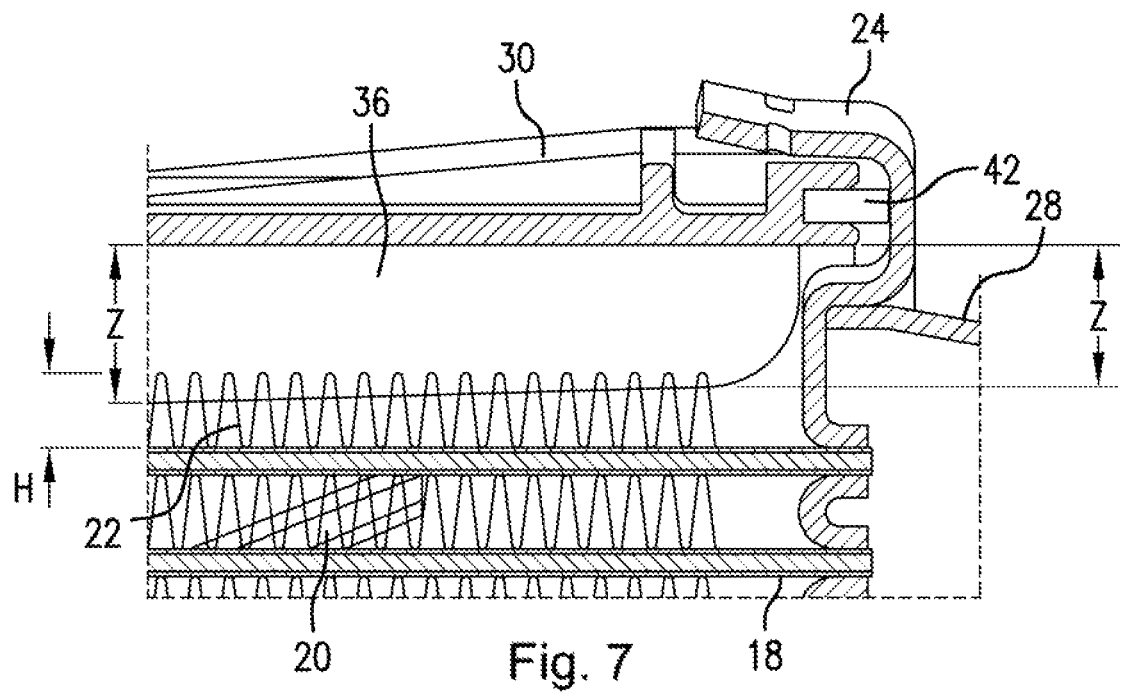
Figure 8:
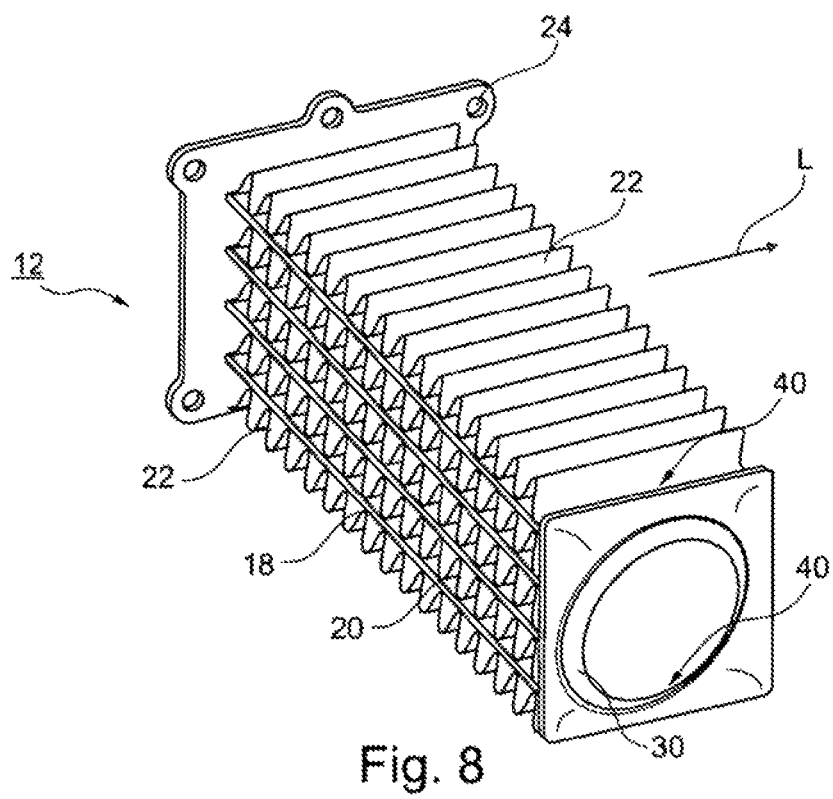
Figure 9:
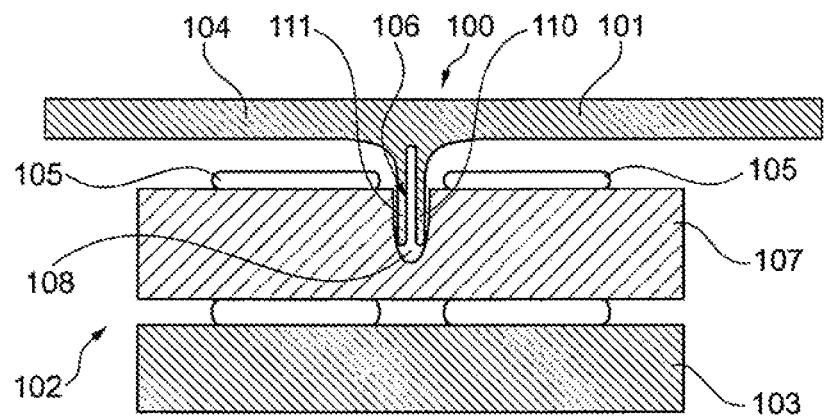
Figure 10:
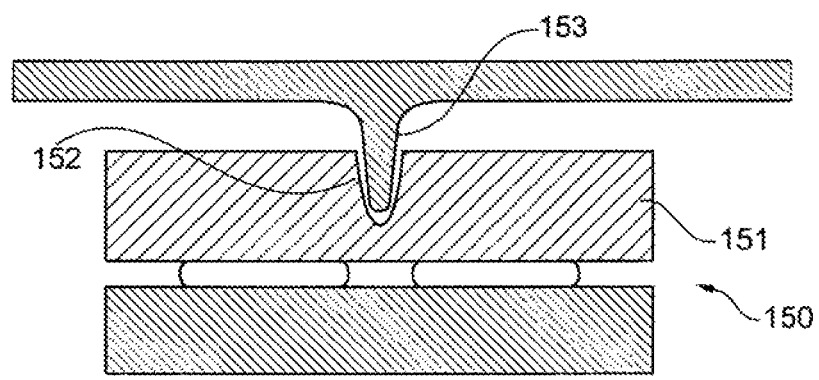
Figure 11:
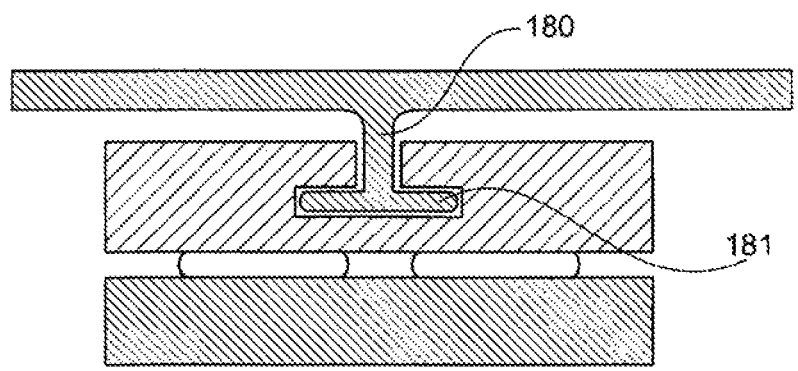
Figure 12:
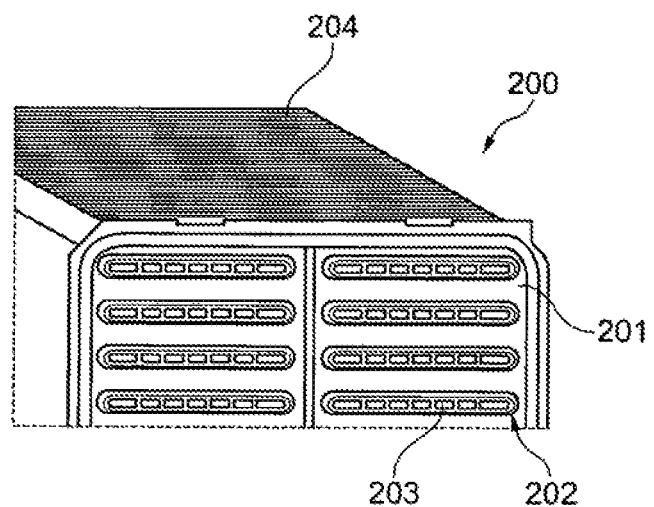
Figure 13:
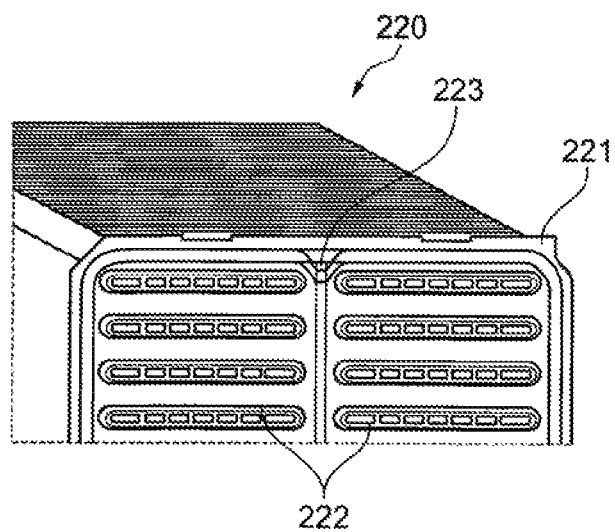
Figures 16, 17:
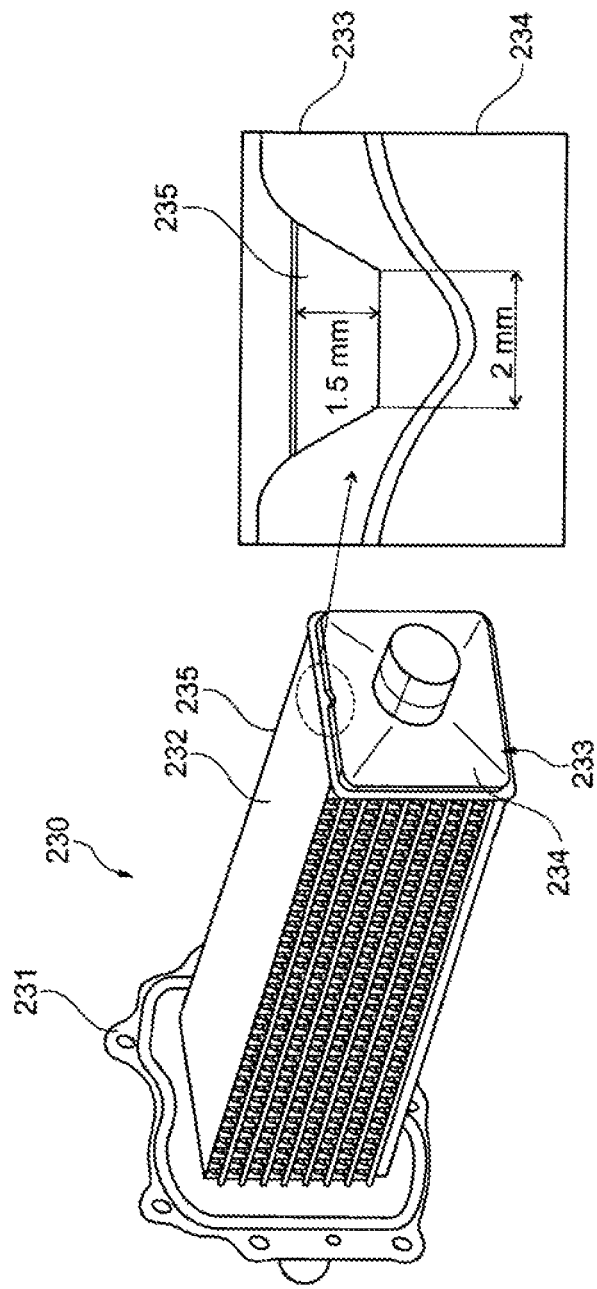

Further advantages, features and possible applications of the present invention result from the following description in conjunction with the figures, in which, in a partially diagrammatic manner:

FIG. 1 shows a perspective view of an intercooler according to a first exemplary embodiment of the invention, FIG. 2 shows details of a perspective view, partially in section, of a connection between the intercooler and the intake pipe housing according to the first exemplary embodiment, FIG. 3 shows a partially perspective view of an intercooler according to a second exemplary embodiment of the invention which has been pushed virtually completely into the intake pipe housing, FIG. 4 shows a partially perspective view of the intercooler from FIG. 3 which has been pushed completely into the intake pipe housing, FIG. 5 shows a perspective cross-sectional view of the intercooler from FIG. 3 which has been pushed into the intake pipe housing, FIG. 6 shows a perspective longitudinal sectional view of the intercooler from FIG. 3 which has been pushed into the intake pipe housing, according to the line A-A in FIG. 5, FIG. 7 shows a perspective longitudinal sectional view of the intercooler from FIG. 3 which has been pushed into the intake pipe housing, according to the line B-B in FIG. 5, FIG. 8 shows a perspective view of an intercooler according to a third exemplary embodiment of the invention, FIG. 9 shows a sectional view with a projection on the housing and a recess on the radiator, FIG. 10 shows a sectional view with a projection on the housing and a recess on the radiator, FIG. 11 shows a sectional view with a projection on the housing and a recess on the radiator, FIG. 12 shows a view of the radiator block with a tube plate, FIG. 13 shows a view of the radiator block with a tube plate, FIG. 14 shows a tube plate, FIG. 15 shows a detail from FIG. 14, FIG. 16 shows a view of a heat exchanger, and FIG. 17 shows a view of a detail of the header box with a tube plate and corrugated fin.

FIGS. 1 to 7 show intercoolers according to a first and a second exemplary embodiment, which intercoolers are integrated into an intake pipe of an internal combustion engine of a motor vehicle. The two exemplary embodiments will be described jointly in the following text, since they differ from one another only slightly.

The housing 10 of the intake pipe defines a charge air channel, through which charge air is fed to the internal combustion engine in the charge air flow direction L. The intercooler 12 is integrated into said charge air channel, it being possible in this exemplary embodiment for said intercooler 12 to be pushed through a corresponding opening in the housing 10 laterally into said housing 10 in an installation direction M substantially perpendicularly with respect to the charge air flow direction L of the charge air through the charge air channel.

Downstream of the intercooler 12, the charge air channel or the intake pipe housing 10 usually branches into a plurality of inlet channels (not shown) which are flange-connected to the cylinder head of the internal combustion engine.

The intercooler 12 has a radiator block 16 which is of substantially rectangular configuration, the longitudinal direction of the radiator block 16 being oriented substantially parallel to the installation direction M of the intercooler 11 and therefore perpendicularly with respect to the charge air flow direction L through the housing 10 of the intake pipe, with the result that the charge air can flow through the radiator block 16.

The radiator block 16 of the intercooler 12 is constructed substantially from a plurality of tubes 18 which are arranged above one another and cooling fins 20 which are arranged inbetween in order to increase the heat exchanging area. As can be seen in FIG. 5, in this exemplary embodiment, two stacks of tubes 18 are additionally arranged behind one another in the charge air flow direction L, in order to increase the cooling performance. According to the invention, the radiator block 16 terminates, on the two sides which face an inner side of the housing 10 perpendicularly with respect to the charge air flow direction L and with respect to the longitudinal direction M of the intercooler 12, in each case with an outer structural element in the form of an outer cooling fin 22. The cooling fins 20, 22 extend over both stacks of the tubes 18 in the charge air flow direction L.

The radiator block 16 of the intercooler 12 is delimited in the longitudinal direction M in each case by a collecting plate 24, 26. Here, a distinction can be made between a front collecting plate 26 in the installation direction M and a rear collecting plate 24 in the installation direction M. The two collecting plates 24, 26 are provided with apertures, into which the tubes 18 of the radiator block 16 are inserted.

The components 18 to 26 of the radiator block 16 are preferably brazed or welded to one another.

The rear collecting plate 24 at the same time forms a fastening flange which projects beyond the opening 14 of the housing 10, with the result that the intercooler 12 can be screwed or riveted (cf. FIGS. 1 and 2) or crimped or clipped (cf. FIGS. 3 to 7) (as an alternative, can be welded or adhesively bonded) to the housing 10 by way of said collecting plate 24. In addition, a sealing element 42, for example in the form of an O-ring seal, is preferably arranged between the front collecting plate 24 and the housing 10 of the intake pipe.

The rear collecting plate 24 is connected to a first header 28 and the front collecting plate 26 is connected to a second header 30. Here, the headers 28, 30 are formed in each case by a type of cover which is connected, in particular welded, brazed or adhesively bonded, to the respective collecting plate 24, 26. The first header 28 is provided with an inflow connector stub 32 and an outflow connector stub 34 (cf. FIGS. 3 and 6). The two stubs 32, 34 are configured in one piece (for examples, molded onto it) with the first header 28 or are welded or brazed to the latter.

In these exemplary embodiments with two stacks of tubes 18, the first header 28 is divided, for example, by a dividing plate which is arranged between the two stacks. Moreover, the second header 30 in these exemplary embodiments is configured integrally with the radiator block 16 or is connected fixedly to the latter; as an alternative, the second header 30 can also be configured as part of the intake pipe housing 10.

A cooling fluid (for example, water) is fed to the first header 28 through the inflow connector stub 32, which cooling fluid is divided from the header, for example, into the upstream tubes 18 of the radiator block 16 in the charge air flow direction L. After flowing through the tubes 18 and exchanging heat with the charge air, the cooling fluid passes into the second header 30 and is diverted from there into the downstream tubes 18 of the radiator block 16. After flowing through the downstream tubes 18 and again exchanging heat with the charge air, the cooling fluid passes again into the first header 28 and is discharged from the latter via the outflow connector stub 34.

As shown in FIGS. 3 and 5, in each case two substantially strip-shaped or fin-shaped projections 36 are formed on the inner sides of the intake pipe housing 10, which inner sides face the outer cooling fins 22 of the radiator block 16. In the first exemplary embodiment of FIG. 2, in each case only one projection 36 is provided on an inner side of the housing 10. In these exemplary embodiments, the projections 36 are configured in one piece with the housing 10 (cf. FIGS. 2 and 5), but they can likewise be configured as separate components and can be connected to the housing 10.

The projections 36 project substantially perpendicularly with respect to the charge air flow direction L and perpendicularly with respect to the longitudinal direction M of the radiator block 16 into the interior of the charge air channel. Moreover, the projections 36 run substantially parallel to one another and substantially parallel to the longitudinal direction M of the radiator block. In addition, the two projections 36 on one side of the radiator block 16 are arranged substantially symmetrically with respect to the center of the radiator block 16 in the charge air flow direction L.

As can be seen, in particular, in FIGS. 2, 3 and 5, when the intercooler 12 is pushed through the opening 14 into the housing 10 of the intake pipe, the outer cooling fins 22 of the radiator block 16 are deformed plastically by the inwardly protruding projections 36. In this way, groove-like recesses 38 are formed in the outer cooling fins 22 of the radiator block 16, which recesses 38 are shaped substantially in a complementary manner with respect to the projections. The recesses 38 likewise run substantially parallel to one another and substantially parallel to the installation direction or longitudinal direction M of the intercooler 10.

As a result of the projections 36 engaging into the recesses 38, labyrinth seals are formed between the housing of the intake pipe and the radiator block 16 of the intercooler 12, which labyrinth seals are intended to keep a leakage flow of the charge air between the intake pipe housing 10 and the radiator block 12 as small as possible. Since the recesses 38 are formed directly by the projections 36 during the installation of the intercooler 12 into the housing 10, at most small gaps are produced between the projections 36 and the recesses 38 with the result of a very low leakage flow of the charge air.

Since the remaining low leakage flow additionally sweeps over the outer cooling fins 22 of the radiator block 16, this leakage flow is also cooled at least somewhat by the intercooler 12. The consequence of this is that the leakage flow of the charge air may be greater in comparison with conventional intercoolers with side parts, without a discernible increase in the temperature of the charge air occurring.

In addition, the omission of side parts of the intercooler 12 advantageously reduces the weight and the production costs of the intercooler 12.

As shown in FIGS. 2 and 7, the projections 36 in each case have a depth Z perpendicularly with respect to the charge air flow direction L, and the outer cooling fins 22 in each case have a height H perpendicularly with respect to the charge air flow direction L. In order to make the introduction of the intercooler 12 into the housing 10 possible, without colliding with the projections 36, the front collecting plate 26 and the second header 30 are dimensioned in such a way that the outer cooling fins 22 of the radiator block 16 project beyond them by a projecting length U (cf. FIG. 1).

In this exemplary embodiment, a ratio H/Z lies in the range from approximately 0.5 to approximately 2. In this exemplary embodiment, the projecting length U of the outer cooling fins 22 lies in the range from 30 to 70%, ideally from 40 to 60% of the height H of the cooling fins 22.

In order to facilitate the formation of the recesses 38 in the outer cooling fins 22 when the intercooler 12 is pushed into the intake pipe housing 10, the projections 36 are preferably configured with an increasing depth Z in the installation direction M of the intercooler 12.

For example, the depth Z of the projections 36 in the region of the front collecting plate 26 is approximately twice as great as in the region of the rear collecting plate 24. In this way, a mean gradient of the depth Z of the projections 36 and therefore of the shaped-out bevel of the recesses 38 of, for example, approximately 0.5° can be achieved.

FIG. 8 shows an intercooler 12 according to a further exemplary embodiment. Here, identical components are labeled with the same designations as in FIGS. 1 to 7 of the first and second exemplary embodiments.

The intercooler 12 of this exemplary embodiment differs from the above-described intercooler of the first exemplary embodiment by virtue of the fact that the front collecting plate 26 is provided with guide elements 40 in the form of notches. When the intercooler 12 is pushed into the housing 10 of the intake pipe, the projections 36 on the housing engage into said guide elements 40, in order to guide the intercooler 12.

With the aid of the guide elements 40, the correct pushing of the intercooler 12 into the intake pipe housing 10 is simplified. Moreover, the projecting length U of the outer cooling fins 22 beyond the front collecting plate 26 can be configured to be lower than in the above exemplary embodiments or such that it does not exist at all.

The invention has been explained using exemplary embodiments, in which the intercooler 12 is pushed through a lateral opening 14 into the intake pipe housing 10 and the recesses 38 for the labyrinth seals between the radiator block 16 of the intercooler 12 and the intake pipe housing 10 are formed directly by the projections 36 on the housing 10 during the mounting operation. The context of the present invention, however, also includes embodiments, in which the recesses 38 are preformed, for example in a groove-like manner, in the outer structural elements 22 of the radiator block 16 and the projections 36 on the housing 10 then simply engage into said recesses 38 during mounting. Specifically in the case of the preformed recesses, additional elastomer seals can be inserted between the recesses and the projections, in order to improve the sealing action. The scope of the invention likewise also includes embodiments, in which the intake pipe housing 10 is of divided configuration in the region of the intercooler 12, with the result that the intercooler 12 can be inserted between the two housing parts.

The constituent parts of the intercooler 12 according to the invention are preferably all manufactured from a lightweight metal such as aluminum and are brazed to one another. A solution of this type can be produced in a way which is particularly secure, permanently resistant to cooling fluid, efficient in cooling terms and inexpensive. The intake pipe housing 10 is manufactured, for example, from a plastic or else from a metal (preferably in the case of high charge pressures or temperatures).

FIG. 9 shows an alternative refinement of the invention. Here, the intercooler 102 which is integrated into the intake pipe 101 has an arrangement 100 according to the invention.

Here, the heat exchanger, such as an intercooler 102, is formed in such a way that, at its outer end which lies opposite the housing 104 of the intake pipe 101, the radiator block 103 is not formed with a cooling element, such as a corrugated fin, but rather with at least two flat tubes 105 which are arranged next to one another, and the projection 106 of the housing 104 of the intake pipe 101 engages between the tubes 105. It can be advantageous here if the projection 106 engages into a cooling element 107 which is arranged below the tubes 105. Here, the projection 106 bends the cooling element 107 at least locally and positively buries itself into the cooling element when it is pushed into the housing. As a result, a channel 108 which receives the projection 106 is produced in the cooling element.

Here, the combination of projection and channel 106, 108 forms a type of labyrinth seal for sealing a bypass flow of the intercooler by the charge air.

As can be seen in FIG. 9, the projection 106 is divided approximately in the center and has a groove 109. This causes the projection 106 to be of resilient configuration with its two tongues 110, 111 and to be loaded toward one another when being pushed into the housing and during production of the channel 108, with the result that they subsequently bear on the outside against the wall regions of the channel with prestress and bring about an improved sealing action.

The projection 106 therefore reaches through between the tubes of the intercooler, advantageously without coming into contact with the latter, and dips into the cooling element. Here, the projection can advantageously be of two-part configuration and can bear elastically against the cutout or channel. This feature of the improved sealing action is not restricted to the exemplary embodiment of FIG. 9, but rather can also be applied in the other exemplary embodiments of this application.

FIG. 10 shows a further alternative refinement of the invention. Here, the outer parts 151 of the heat exchanger block 150 are not configured as a cooling element, such as a corrugated fin, but rather are one body which can be formed solidly or as a foamed body. Here, the foamed body is advantageously configured as a metal foamed body, in particular an aluminum foamed body. As an alternative, the outer part can also be a geometrically shaped part which has, for example, a preformed channel 152 for receiving the projection 153.

FIG. 11 shows a further alternative of the invention, according to which the projection and also the recess which corresponds to it are designed in such a way that the projection 180 has an element 181 which brings about an undercut. Here, the element is advantageously formed in such a way that the projection 180 is T-shaped or L-shaped. The cutout which corresponds to it has a design such that it can receive the projection which is formed in this way.

According to a further exemplary embodiment, it is not the housing of the intake pipe that has the projection, but rather the outer part of the heat exchanger, with the result that said outer part produces a receptacle in the region of the intake pipe when being pushed in or engages into the receptacle of this type. It is advantageous here if the outer component of the heat exchanger is not the cooling element, such as the corrugated fin, but rather is a solid material or a foamed material, such as an aluminum foam.

FIG. 12 shows a detail of an intercooler 200 according to the present invention; merely the tube plate 201 with the tubes 203 which are pushed into the tube openings 202 can be seen. The tube plate 201 is widened in the radial direction in comparison with the body 204 of the intercooler, with the result that a projection in the housing of the intercooler produces a groove or recess in the central region which is identified by D when the intercooler is pushed in, which groove or recess produces a type of labyrinth seal together with the projection. Here, the recess is advantageously produced in the region of an intermediate space between two tube rows.

FIGS. 13 to 17 show a further embodiment, in which the tube plate has a cutout in the region between the tube rows, in order that the projection of the housing of the intake pipe can be received favorably in the outer face of the intercooler.

In addition, FIG. 13 shows the view of the body 220 of the radiator without header box. In the region between the tubes 222, the tube plate 221 has a cutout at the upper edge, this advantageously also being configured in this way at the lower edge.

FIG. 14 shows the tube plate 221 with the cutout 223 at the upper and at the lower edge which are arranged approximately in the middle of the longitudinal sides.

In addition, FIG. 15 shows a detail, in which the cutout is shown in greater detail. It is configured approximately in the manner of a parallelogram with a depth of approximately 1.5 mm and a bottom width of approximately 2 mm.

FIG. 16 shows the heat exchanger 230 with fastening flange 231, tube/fin block 232 and termination-side tube plate 233 with header box 234. Here, the upper and lower layers 235 and 236 are preferably configured as a corrugated fin or a similarly soft element. FIG. 17 shows a detail from the front header box 234 with tube plate 233 and corrugated fin 235. It can be seen here that both the header box and the tube plate have a cutout, into which a projection of the housing can engage. Here, the corrugated fin is then deformed in this region and forms a labyrinth seal together with the projection (not shown).

The invention claimed is:

1. An intake pipe for an internal combustion engine having a housing which defines a charge air channel, and having an intercooler with a radiator block which is arranged in the housing in such a way that the charge air can flow through it, wherein, on a side that faces the housing, the radiator block of the intercooler terminates with an outer structural element;

at least one recess is formed in said outer structural element of the radiator block, which recess extends at least over a part of the length of the radiator block substantially transversely with respect to a charge air flow direction; and at least one projection is provided on an inner side of the housing, which inner side faces the radiator block of the intercooler, which projection extends at least over part of the inner side of the housing substantially transversely with respect to the charge air flow direction, and engages sealingly at least partially into the at least one recess of the radiator block, wherein the at least one recess in the outer structural element of the radiator block or in the housing of the intake pipe is formed, during a mounting operation of the intercooler into the housing of the intake pipe, by the at least one projection on the inner side of the housing or of the outer part of the intercooler.

2. The intake pipe as claimed in claim 1, wherein the housing has an opening for pushing the intercooler into the housing in the direction transversely with respect to the charge air flow direction.

3. The intake pipe as claimed in claim 1, wherein the intercooler has a collecting plate on its front side in the installation direction; and the outer structural element of the radiator block projects beyond a plane perpendicular to the top of the front collecting plate by a projecting length.

4. The intake pipe as claimed in claim 3, wherein the projecting length of the outer structural element of the radiator block lies in a range from approximately 20% to approximately 80% of a total height of the outer structural element in the direction transversely with respect to the charge air flow direction.

5. The intake pipe as claimed in claim 4, wherein the projecting length of the outer structural element of the radiator block lies in a range from approximately 30% to approximately 70% of a total height of the outer structural element in the direction transversely with respect to the charge air flow direction.

6. The intake pipe as claimed in claim 1, wherein the intercooler has a collecting plate on its front side in the installation direction; and the front collecting plate of the intercooler is provided with at least one guide element, into which the at least one projection on the inner side of the housing can engage during the mounting operation of the intercooler into the housing.

7. The intake pipe as claimed in claim 1, wherein the projection on the inner side of the housing has an increasing depth perpendicularly with respect to the charge air flow direction in the installation direction of the intercooler.

8. The intake pipe as claimed in claim 7, wherein a mean gradient of the depth of the projection lies in the range from approximately 0.1° to approximately 5°.

9. The intake pipe as claimed in claim 8, wherein a mean gradient of the depth of the projection lies in the range from approximately 0.25° to approximately 2°.

10. The intake pipe as claimed in claim 1, wherein a ratio of a total height of the outer structural element of the radiator block transversely with respect to the charge air flow direction to a depth of the projection on the inner side of the housing lies in a range from approximately 0.3 to approximately 3.

11. The intake pipe as claimed in claim 10, wherein a ratio of a total height of the outer structural element of the radiator block transversely with respect to the charge air flow direction to a depth of the projection on the inner side of the housing lies in a range from approximately 0.5 to approximately 2.

12. The intake pipe as claimed in claim 1, wherein the outer structural element is a plurality of tubes which are spaced apart from one another, the spacing between the tubes forming the at least one recess for the engagement of the projection.

13. The intake pipe as claimed in claim 12, wherein the projection engages into a part of the radiator which is adjacent to the outer part of the intercooler and has a recess for receiving the projection.

14. The intake pipe as claimed in claim 1, wherein the projection is divided into at least two and the two flanks of the projection are of elastic configuration in order to bear against a side face of the projection under prestress.

15. The intake pipe as claimed in claim 1, wherein the projection is provided with an undercut.

16. The intake as claimed in claim 1, wherein the internal combustion engine is a motor vehicle.

17. An intake pipe for an internal combustion engine having a housing which defines a charge air channel, and having an intercooler with a radiator block which can be arranged in the housing in such a way that the charge air can flow through it, wherein,
on a side that faces the housing, the radiator block of the intercooler terminates with an outer structural element;
at least one projection is formed on said outer structural element of the radiator block, which projection extends at least over part of the length of the radiator block substantially transversely with respect to a charge air flow direction; and
at least one recess is provided on an inner side of the housing, which inner side faces the radiator block of the intercooler, which recess extends at least over part of the inner side of the housing substantially transversely with respect to the charge air flow direction, and the projection engaging sealingly at least partially into the at least one recess,
wherein the at least one recess in the outer structural element of the radiator block or in the housing of the intake pipe is formed, during a mounting operation of the intercooler into the housing of the intake pipe, by the at least one projection on the inner side of the housing or of the outer part of the intercooler.

18. The intake as claimed in claim 17, wherein the internal combustion engine is a motor vehicle.

* * * * *